(12) United States Patent
Yokoyama et al.

(10) Patent No.: US 11,230,938 B2
(45) Date of Patent: Jan. 25, 2022

(54) FIXED VANE TURBOCHARGER

(71) Applicant: MITSUBISHI HEAVY INDUSTRIES ENGINE & TURBOCHARGER, LTD., Sagamihara (JP)

(72) Inventors: Takao Yokoyama, Tokyo (JP); Toru Hoshi, Tokyo (JP)

(73) Assignee: MITSUBISHI HEAVY INDUSTRIES ENGINE & TURBOCHARGER, LTD., Sagamihara (JP)

( * ) Notice: Subject to any disclaimer, the term of this patent is extended or adjusted under 35 U.S.C. 154(b) by 110 days.

(21) Appl. No.: 16/088,189

(22) PCT Filed: Mar. 30, 2016

(86) PCT No.: PCT/JP2016/060467
§ 371 (c)(1),
(2) Date: Sep. 25, 2018

(87) PCT Pub. No.: WO2017/168647
PCT Pub. Date: Oct. 5, 2017

(65) Prior Publication Data
US 2020/0116036 A1 Apr. 16, 2020

(51) Int. Cl.
*F01D 9/04* (2006.01)
(52) U.S. Cl.
CPC .......... *F01D 9/045* (2013.01); *F05D 2220/40* (2013.01)
(58) Field of Classification Search
CPC ....................................................... F01D 9/045
See application file for complete search history.

(56) References Cited

U.S. PATENT DOCUMENTS 3,292,364 A 12/1966 Cazier
8,926,276 B2* 1/2015 Japikse .................. F01D 5/142
415/208.3

(Continued)

FOREIGN PATENT DOCUMENTS

JP 63-19002 U 2/1988
JP 2008-196452 A 8/2008

(Continued)

OTHER PUBLICATIONS

Extended European Search Report effective Feb. 20, 2019 issued to the corresponding EP Application No. 16896866.7.

(Continued)

*Primary Examiner* — Woody A Lee, Jr.
(74) *Attorney, Agent, or Firm* — Birch, Stewart, Kolasch & Birch, LLP (57) ABSTRACT

A fixed vane turbocharger includes: an impeller; a housing including, inside thereof, an impeller housing space which accommodates the impeller, a scroll flow passage formed on a radially outer side of the impeller, and a communication flow passage which brings the impeller housing space and the scroll flow passage into communication; and at least one fixed vane unit disposed in the communication flow passage and fixed to a portion of the housing on an inner side of the scroll flow passage with respect to a radial direction of the impeller. Each of the at least one fixed vane unit includes at least two vane portions and a coupling portion coupling the two vane portions, and is formed of a single sheet metal member.

16 Claims, 12 Drawing Sheets

(56) References Cited

U.S. PATENT DOCUMENTS

| | | | |
|---|---|---|---|
| 9,234,456 B2 * | 1/2016 | Parker | F02B 37/22 |
| 2012/0014788 A1 * | 1/2012 | Blair | F04D 25/163 |
| | | | 415/208.2 |
| 2012/0023936 A1 | 2/2012 | Kruiswyk et al. | |

FOREIGN PATENT DOCUMENTS

| | | |
|---|---|---|
| JP | 2008-196453 A | 8/2008 |
| WO | WO 2011/042694 A2 | 4/2011 |

OTHER PUBLICATIONS

International Preliminary Report on Patentability and Written Opinion of the International Searching Authority (Forms PCT/IB/338, PCT/IB/373 and PCT/ISA/237) for International Application No. PCT/JP2016/060467, dated Oct. 11, 2018, with English translation.
International Search Report (Form PCT/ISA/237) for International Application No. PCT/JP2016/060467, dated Jun. 7, 2016.
Office Action effective Jul. 16, 2019 issued in the corresponding Japanese Application No. 2018-507950 with an English Machine Translation.
Office Action dated Apr. 9, 2020 issued in the corresponding European Application No. 16896866.7.
Office Action dated Oct. 4, 2019 issued in the corresponding European Patent Application No. 16896866.7.
Office Action dated Apr. 27, 2020 issued in counterpart Chinese Application No. 201680083694.7.

\* cited by examiner

CIRCUMFERENTIAL DIRECTION

FIXED VANE TURBOCHARGER

TECHNICAL FIELD

The present disclosure relates to a fixed vane turbocharger.

BACKGROUND ART

In recent years, engines have been reduced in size thanks to forced supercharging, and a turbocharger is now also mounted to gasoline engines of a small exhaust amount. Thus, turbochargers are also reduced in size, and the production accuracy of each component has a greater influence on the performance of a turbocharger.

In some cases, an exhaust turbine of a turbocharger is provided with fixed vanes that do not rotate, disposed in a flow passage between a scroll flow passage and a turbine impeller, to rectify the flow of exhaust gas from the scroll flow passage to the turbine impeller and suppress variation of the performance (flow rate and efficiency).

Normally, the fixed vanes of a turbocharger are casted. Thus, the fixed vanes tend to have a high surface roughness on the surfaces, which makes it difficult to improve the efficiency of the turbocharger.

Patent Document 1 discloses a fixed vane turbocharger including fixed vanes formed by joining a plurality of plate members so as to intersect with one another.

CITATION LIST

Patent Literature

Patent Document 1: WO2011/042694A

SUMMARY

Problems to be Solved

With the fixed vane turbocharger disclosed in Patent Document 1, it is possible to reduce the surface roughness of the plate members easily, and thus further improvement of the efficiency of the turbocharger can be expected by providing fixed vanes having a smaller surface roughness compared to casted fixed vanes.

However, the fixed vanes disclosed in Patent Document 1 are formed by joining a plurality of plate members so as to intersect with one another, which makes the structure complex.

The present invention was made in view of the above described typical problem, and an object of the present invention is to provide a fixed vane turbocharger whereby it is possible to achieve a high efficiency with a simple configuration.

Solution to the Problems (1) According to at least one embodiment of the present invention, a fixed vane turbocharger includes: an impeller; a housing including, inside thereof, an impeller housing space which accommodates the impeller, a scroll flow passage formed on a radially outer side of the impeller, and a communication flow passage which brings the impeller housing space and the scroll flow passage into communication; and at least one fixed vane unit disposed in the communication flow passage and fixed to a portion of the housing on an inner side of the scroll flow passage with respect to a radial direction of the impeller. Each of the at least one fixed vane unit includes at least two vane portions and a coupling portion coupling the two vane portions, and is formed of a single sheet metal member.

With the above fixed vane turbocharger (1), each of the fixed vane units is formed by a single sheet metal member, and thus it is possible to improve the surface roughness and reduce costs of the fixed vane units, compared to a case where each fixed vane unit is formed by casting. Thus, it is possible to enhance the rectifying effect of the fixed vane units, and improve the efficiency of the turbocharger with a simple configuration. Furthermore, the at least two vane portions are coupled via the coupling portion, and thus it is possible to increase the section modulus of the fixed vane units and suppress deformation and collapse due to the hydrodynamic force.

(2) In some embodiments, in the above fixed vane turbocharger (1), the at least one fixed vane unit is formed by the single sheet metal member over an entire periphery in a circumferential direction of the impeller.

With the above fixed vane turbocharger (2), it is possible to enhance the rigidity of the fixed vane unit as a whole. Further, an inward hydrodynamic force in the radial direction is offset, and thus it is possible to fix the fixed vane unit to the housing with a smaller fixing force (e.g. if the fixed vane unit is fastened by bolt fastening, a smaller fastening force).

(3) In some embodiments, in the above fixed vane turbocharger (1), the at least one fixed vane unit includes a plurality of fixed vane units disposed at intervals in a circumferential direction.

According to the fixed vane turbocharger (3), the fixed vane unit is divided into a plurality of fixed vane units, and thus the fixed vane units can be reduced in size while ensuring the structure strength, compared to a case where the fixed vane unit is formed of a single sheet metal member over the entire periphery in the circumferential direction.

Further, it is possible to adjust the installment angle of the fixed vane units when installing the fixed vane units, and thus it is possible to achieve flow rate characteristics corresponding to the installment angle of the fixed vane units. For instance, to address a small flow rate, the fixed vane units may be installed so that the angle between the chordwise direction of the vane portions and the circumferential direction becomes small. Further, to address a high flow rate, the fixed vane units may be installed so that the angle between the chordwise direction of the vane portions and the circumferential direction becomes large. Furthermore, the unnecessary part of the fixed vane unit formed of sheet metal produced from a common mold may be cut apart to adjust the installment angle of the fixed vane units, which makes it possible to achieve a desired flow rate property with a simple configuration and low costs.

(4) In some embodiments, in the fixed vane turbocharger according to any one of the above (1) to (3), the at least one fixed vane unit includes a plurality of fixed vane units stacked in an axial direction of the impeller.

With the above fixed vane turbocharger (4), the deformation amount in the axial direction per fixed vane unit decreases, and thus the manufacturability improves. Furthermore, it is possible to control the flow angle and the flow amount in the axial direction (height direction of the vane portion) of the impeller, and thus it is possible to improve the performance of the turbocharger.

(5) In some embodiments, in the fixed vane turbocharger according to any one of the above (1) to (4), at least a trailing-edge side portion of the vane portion is curved so as to be convex on a side of a pressure surface.

With the above fixed vane turbocharger (5), fluid strain near the trailing-edge side portion is suppressed, and thereby it is possible to improve the efficiency and enhance the reliability of the rotor blades of the turbine impeller (reduce an excitation force that excites the rotor blades).

(6) In some embodiments, in the fixed vane turbocharger according to any one of the above (1) to (5), a metal angle at a leading edge of the vane portion with respect to a tangent in a circumferential direction of the impeller is greater than a metal angle at a trailing edge of the vane portion with respect a tangent in the circumferential direction.

With the above fixed vane turbocharger (6), it is possible to suppress loss due to collision of the leading edge of the vane portion of the fixed vane unit with a flow flowing into the communication flow passage from the scroll flow passage.

(7) In some embodiments, in the above fixed vane turbocharger according to any one of the above (1) to (6), a leading-edge side portion of the vane portion is rounded so that a tip of the leading-edge side portion is positioned downstream of a leading edge of the vane portion.

According to the above description (7), the leading-edge side portion of the vane portion is rounded as described above, and thereby it is possible to suppress loss due to collision of the leading edge of the vane portion of the fixed vane unit with a flow flowing into the communication flow passage from the scroll flow passage.

(8) In some embodiments, in the fixed vane turbocharger according to any one of the above (1) to (7), a trailing edge of the vane portion extends in a direction inclined toward a circumferential direction from an axial direction of the impeller.

With the above fixed vane turbocharger (8), the phase of excitation of the rotor blades of the turbine impeller by the exhaust gas passing through the vane portions is displaced, which makes it possible to suppress an oscillation stress of the rotor blades. Furthermore, in a case where the fixed vane unit expands due to heat of exhaust gas, it is possible to absorb the displacement with bending of the vane portions, and thus it is possible to suppress occurrence of buckling in the vane portions.

Advantageous Effects

According to at least one embodiment of the present invention, it is possible to provide a fixed vane turbocharger whereby it is possible to achieve a high efficiency through a simple configuration.

DETAILED DESCRIPTION

Embodiments of the present invention will now be described in detail with reference to the accompanying drawings. It is intended, however, that unless particularly identified, dimensions, materials, shapes, relative positions and the like of components described in the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

Figure 1:
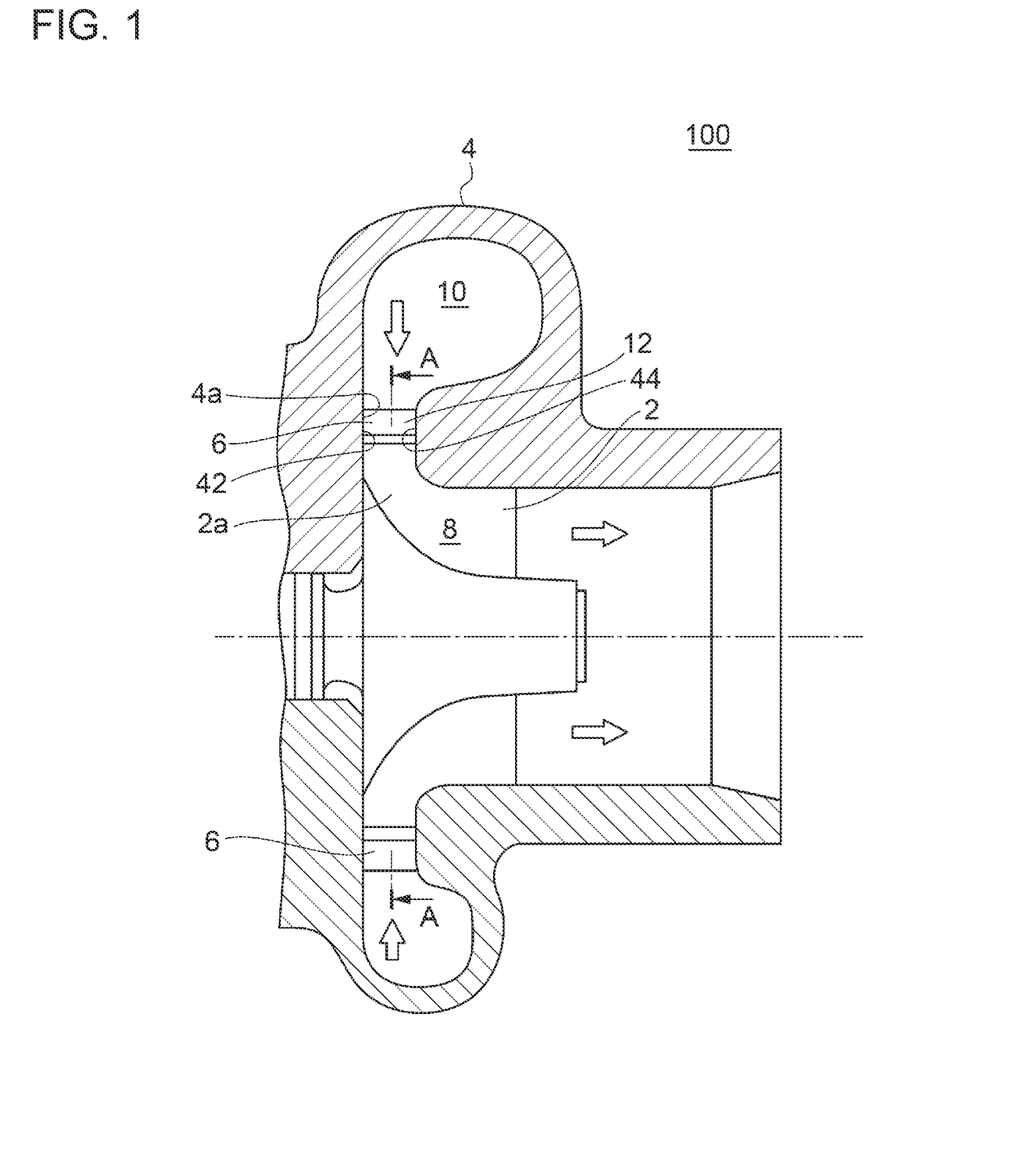
FIG. 1 is a schematic cross-sectional view of a fixed vane turbocharger 100 according to an embodiment of the present invention, taken along the rotational axis of the turbocharger 100.

FIG. 1 is a schematic cross-sectional view of a fixed vane turbocharger 100 according to an embodiment of the present invention, taken along the rotational axis of the turbocharger 100.

The fixed vane turbocharger 100 includes a turbine impeller 2 disposed coaxially with a non-depicted compressor, a housing 4, and at least one fixed vane unit 6.

Hereinafter, unless otherwise stated, the axial direction of the turbine impeller 2 is referred to as merely "axial direction", the radial direction of the turbine impeller 2 is referred to as merely "radial direction", and the circumferential direction of the turbine impeller 2 is referred to as merely "circumferential direction".

The housing 4 includes, inside thereof, an impeller housing space 8 that accommodates the turbine impeller 2, a scroll flow passage 10 formed on the radially outer side of the turbine impeller 2, and a communication flow passage 12 which brings the impeller housing space 8 and the scroll flow passage 10 into communication.

The fixed vane unit 6 is disposed in the communication flow passage 12, and is fixed by a device such as a bolt to a portion 4a on the inner side of the scroll flow passage 10 with respect to the radial direction of the housing 4. The fixed vane unit 6 is disposed inside the communication flow passage 12 so as not to extend in the scroll flow passage 10.

In the embodiment shown in FIG. 1, exhaust gas flowing into a non-depicted engine to the scroll flow passage 10 flows from the scroll flow passage 10 to the communication flow passage 12, and is rectified by the fixed vane unit 6 disposed in the communication flow passage 12, before being supplied to rotor blades 2a of the turbine impeller 2.

Figure 2:
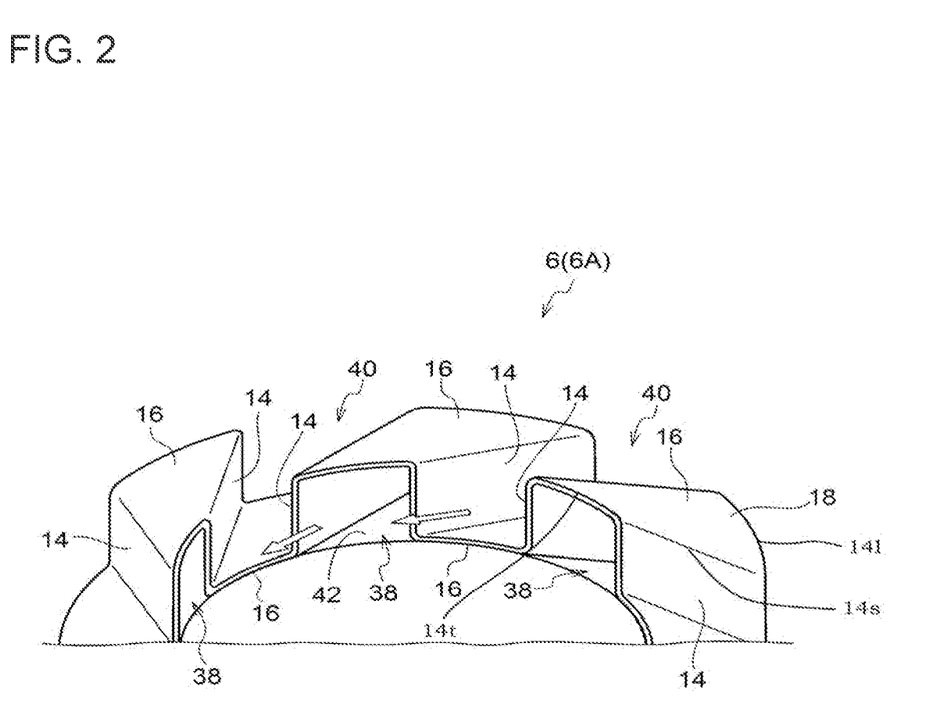
FIG. 2 is a schematic perspective view schematically illustrating a part of a fixed vane unit 6 (6A) according to an embodiment.
Figure 3:
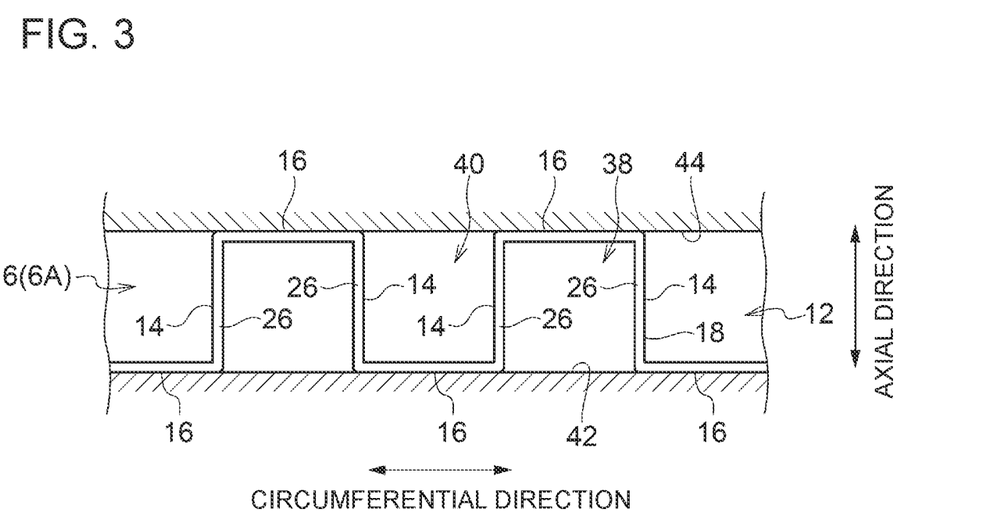
FIG. 3 is a schematic diagram of an example of the shape of a trailing edge 26 of a vane portion 14 of the fixed vane unit 6 (6A).
Figure 4:
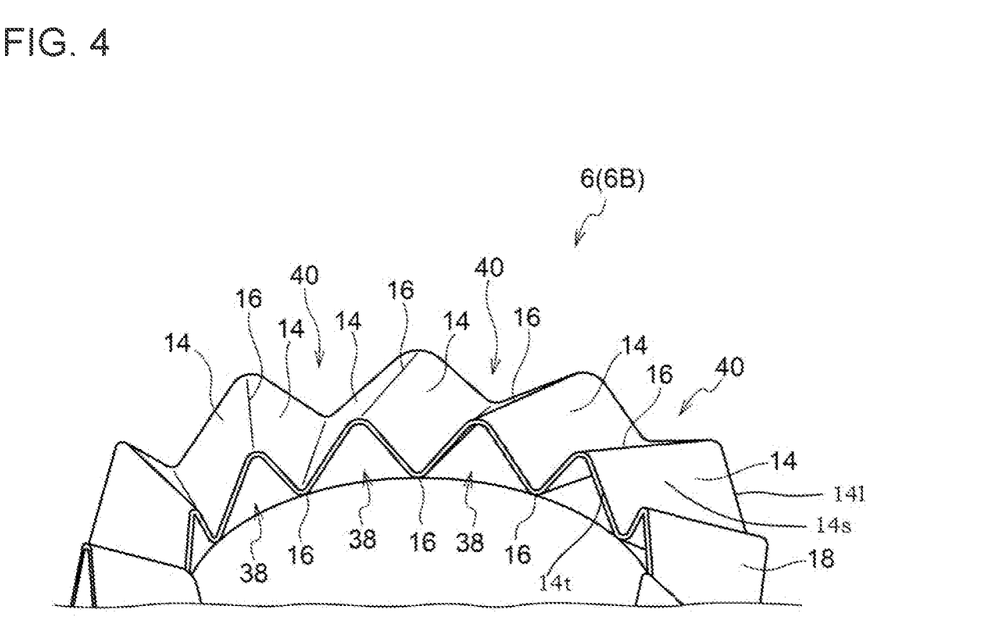
FIG. 4 is a schematic perspective view schematically illustrating a part of a fixed vane unit 6 (6B) according to an embodiment.
Figure 5:
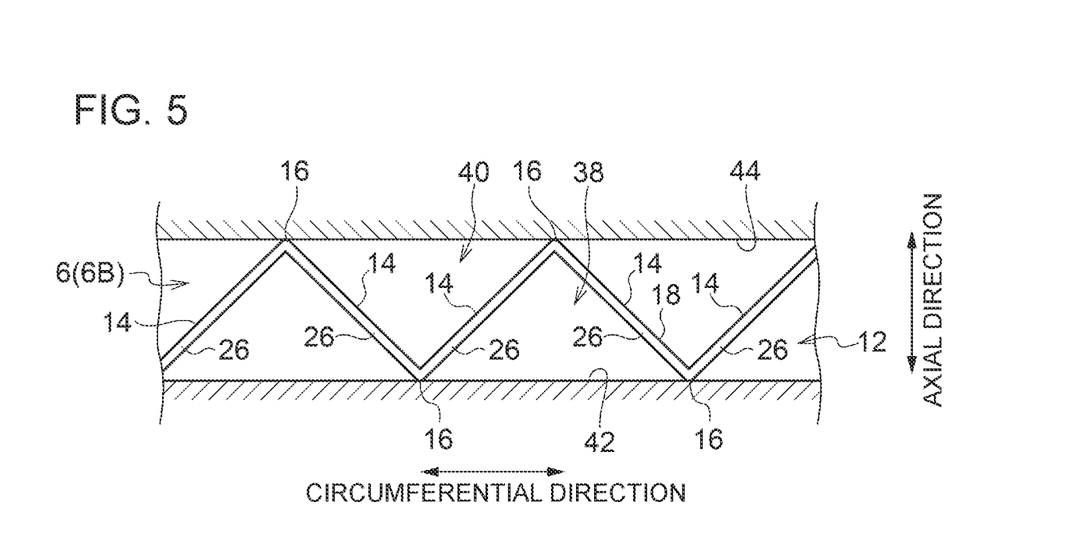
FIG. 5 is a schematic diagram of an example of the shape of a trailing edge 26 of a vane portion 14 of the fixed vane unit 6 (6B).
Figure 6:
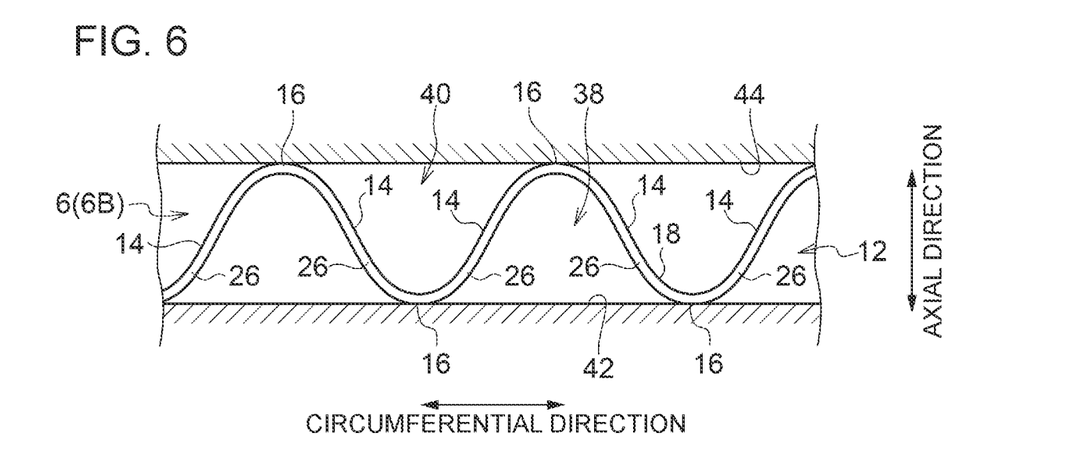
FIG. 6 is a schematic diagram of an example of the shape of a trailing edge 26 of a vane portion 14 of the fixed vane unit 6 (6B).
Figure 7:
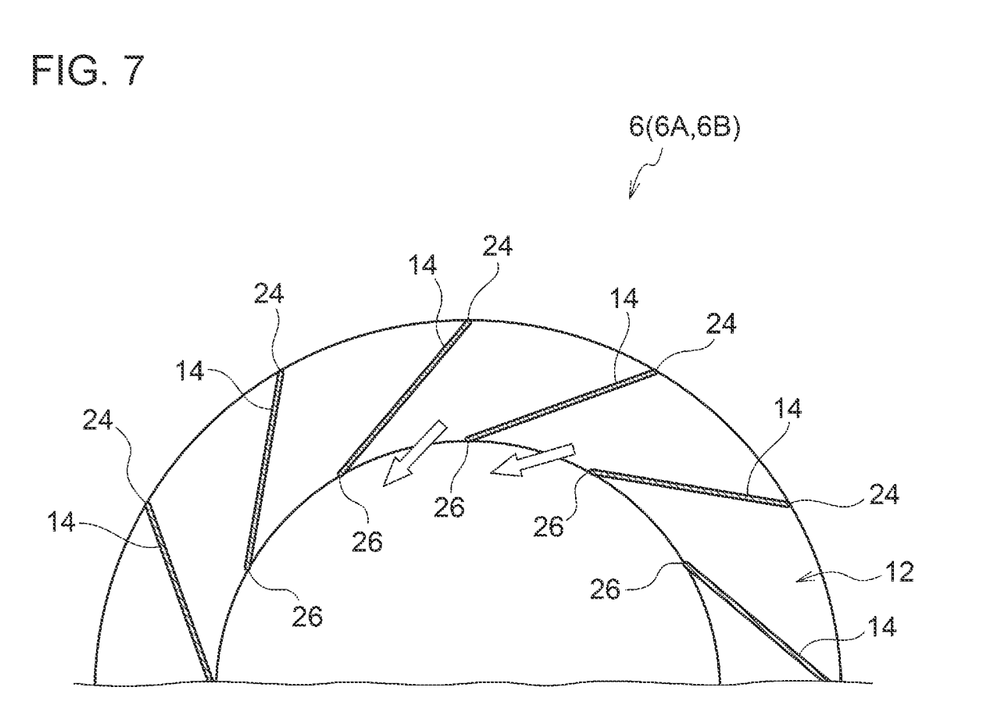
FIG. 7 is a cross-sectional view of the fixed vane unit 6 (6A, 6B) taken along line A-A (see FIG. 1), that is, a schematic cross-sectional view schematically illustrating an example of a cross section orthogonal to the axial direction.
Figure 8:
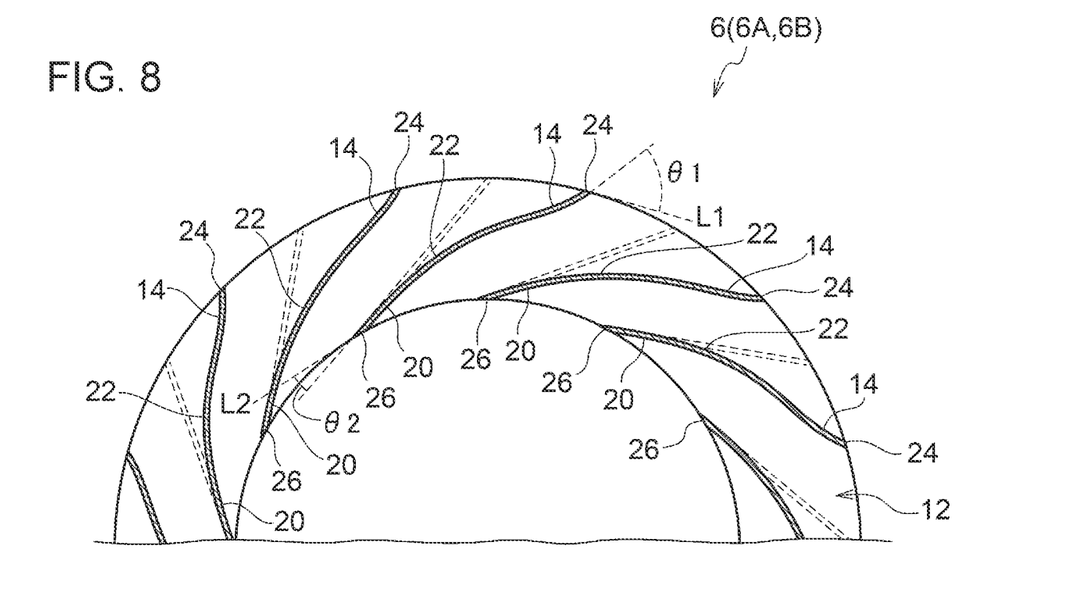
FIG. 8 is a schematic diagram of an example of a cross section of the fixed vane unit 6 (6A, 6B), taken along line A-A.
Figure 9:
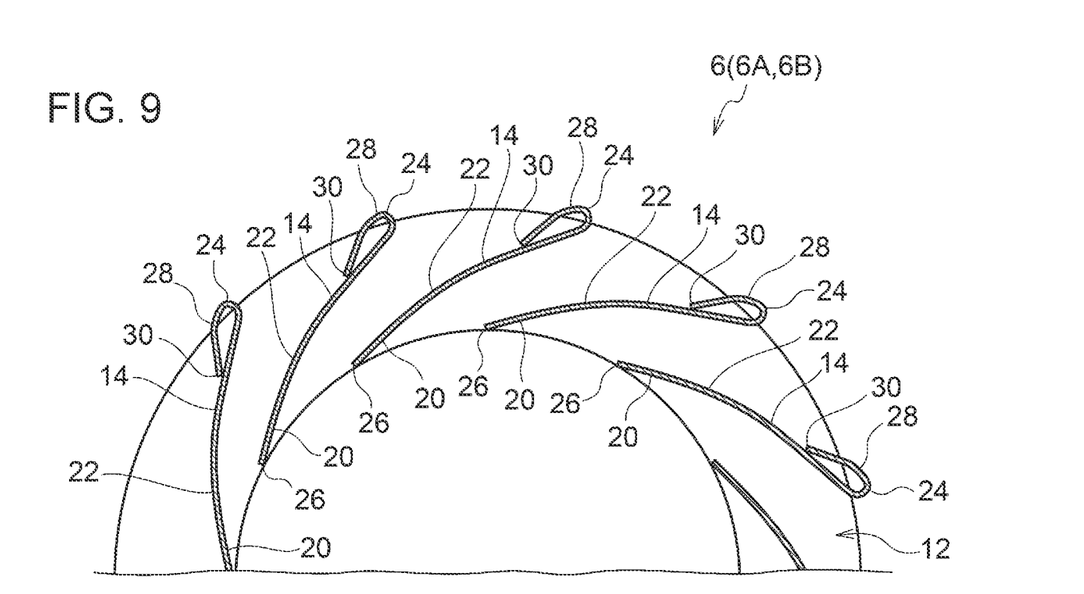
FIG. 9 is a schematic diagram of an example of a cross section of the fixed vane unit 6 (6A, 6B), taken along line A-A.

FIG. 2 is a schematic perspective view schematically illustrating a part of a fixed vane unit 6 (6A) according to an embodiment. FIG. 3 is a schematic diagram of an example of the shape of a trailing edge 26 of a vane portion 14 of the fixed vane unit 6 (6A). FIG. 4 is a schematic perspective view schematically illustrating a part of a fixed vane unit 6 (6B) according to an embodiment. FIG. 5 is a schematic diagram of an example of the shape of a trailing edge 26 of a vane portion 14 of the fixed vane unit 6 (6B). FIG. 6 is a schematic diagram of an example of the shape of a trailing edge 26 of a vane portion 14 of the fixed vane unit 6 (6B). FIG. 7 is a cross-sectional view of the fixed vane unit 6 (6A) taken along line A-A (see FIG. 1), that is, a schematic cross-sectional view schematically illustrating an example of a cross section orthogonal to the axial direction. FIG. 8 is a schematic diagram of an example of a cross section of the fixed vane unit 6 (6A, 6B), taken along line A-A. FIG. 9 is a schematic diagram of an example of a cross section of the fixed vane unit 6 (6A, 6B), taken along line A-A.

In some embodiments, as shown in FIGS. 2 to 6 for instance, each of the fixed vane units 6 (6A, 6B) includes at least two vane portions 14 and a coupling portion 16 coupling the two vane portions, and is formed by a single sheet metal member 18. In an illustrative embodiment, the fixed vane unit 6 includes multiple (three or more) vane portions 14 and multiple (three or more) coupling portions 16, and the vane portions 14 and the coupling portion 16 are arranged alternately in the circumferential direction. The fixed vane unit 6 (6A) depicted in FIG. 2 has a shape formed by bending the single sheet metal member 18 into a rect-angular corrugated shape (see FIG. 3) periodically, and the fixed vane unit 6 (6B) depicted in FIG. 4 has a shape formed by curving the single sheet metal member 18 into a triangular wave shape (see FIG. 5) or a sine wave shape (see FIG. 6) periodically. The van portion 14 in FIGS. 2 and 4 includes a leading edge 14*l*, trailing edge 14*t* and side edge 14*s*.

In some embodiments, as shown in FIGS. 3, 5, and 6 for instance, the fixed vane unit 6 (6A, 6B) is configured to divide the communication flow passage 12 so that hub-side flow passages 38 and shroud-side flow passages 40 are positioned alternately in the circumferential direction. Each of the hub-side flow passages 38 is defined by two vane portions 14, a coupling portion 16 coupling the two vane portions 14, and a hub-side wall 42 of the communication flow passage 12. Each of the shroud-side flow passages 40 is defined by two vane portions 14, a coupling portion 16 coupling the two vane portions 14, and a shroud-side wall 44 of the communication flow passage 12.

With the above configuration, each of the fixed vane units 6 is formed by a single sheet metal member 18, and thus it is possible to improve the surface roughness and reduce costs of the fixed vane units 6, compared to a case where each fixed vane unit 6 is formed by casting. Thus, it is possible to enhance the rectifying effect of the fixed vane units 6, and improve the efficiency of the turbocharger 100 with a simple configuration. Furthermore, the at least two vane portions 14 are coupled via the coupling portion 16, and thus it is possible to increase the section modulus of the fixed vane unit 6 and suppress deformation and collapse due to the hydrodynamic force.

In some embodiments, the fixed vane unit 6 (6A, 6B) is formed by a single sheet metal member 18 over the entire periphery in the circumferential direction.

With the above configuration, it is possible to enhance the rigidity of the fixed vane unit 6 (6A, 6B) as a whole. Further, an inward hydrodynamic force in the radial direction is offset, and thus it is possible to fix the fixed vane unit 6 to the housing 4 with a smaller fixing force (e.g. if the fixed vane unit 6 is fastened by bolt fastening, a smaller fastening force).

In an embodiment, as shown in FIG. 3 for instance, the trailing edge 26 of the vane portion 14 extends parallel to the axial direction. In some embodiments, as shown in FIGS. 5 and 6 for instance, the trailing edge 26 of the vane portion 14 extends in a direction inclined toward the circumferential direction from the axial direction.

According to the embodiments shown in FIGS. 5 and 6, the trailing edge 26 of the vane portion 14 extends in a direction inclined toward the circumferential direction from the axial direction, and thereby the phase of excitation of the rotor blades 2a of the turbine impeller 2 by the exhaust gas passing through the vane portions 14 is displaced, which makes it possible to suppress an oscillation stress of the rotor blades 2a. Furthermore, in a case where the fixed vane unit 6 expands due to heat of exhaust gas, it is possible to absorb the displacement with bending of the vane portion 14, and thus it is possible to suppress occurrence of buckling in the vane portion 14.

In an embodiment, as shown in FIG. 7 for instance, the vane portions 14 extend linearly in a cross section orthogonal to the axial direction. With the above configuration, it is possible to simplify the configuration of the fixed vane units 6.

In some embodiments, as shown in FIGS. 8 and 9 for instance, at least the trailing-edge side portion 20 of the vane portion 14 is curved so as to be convex on the side of the pressure surface 22.

With the above configuration, fluid strain near the trailing-edge side portion 20 is suppressed, and thereby it is possible to improve the efficiency and enhance the reliability of the rotor blades 2a of the turbine impeller (see FIG. 1) (reduce an excitation force that excites the rotor blades 2a).

In an embodiment, as shown in FIG. 8 for instance, the metal angle θ1 at the leading edge 24 of the vane portion 14 with respect to the tangent L1 in the circumferential direction is greater than the metal angle θ2 at the trailing edge 26 of the vane portion 14 with respect to the tangent L2 in the circumferential direction.

With the above configuration, it is possible to suppress loss due to collision of the leading edge 24 of the vane portion 14 of the fixed vane unit 6 with a flow flowing into the communication flow passage 12 from the scroll flow passage 10.

In an embodiment, as shown in FIG. 9 for instance, the leading-edge side portion 28 of the vane portion 14 is rounded so as that the tip 30 of the leading-edge side portion 28 is positioned downstream of the leading edge 24 of the vane portion 14.

With the above configuration, the leading-edge side portion 28 of the vane portion 14 is rounded as described above, and thereby it is possible to suppress loss due to collision of the leading edge 24 of the vane portion 14 of the fixed vane unit 6 with a flow flowing into the communication flow passage 12 from the scroll flow passage 10.

Figure 10:
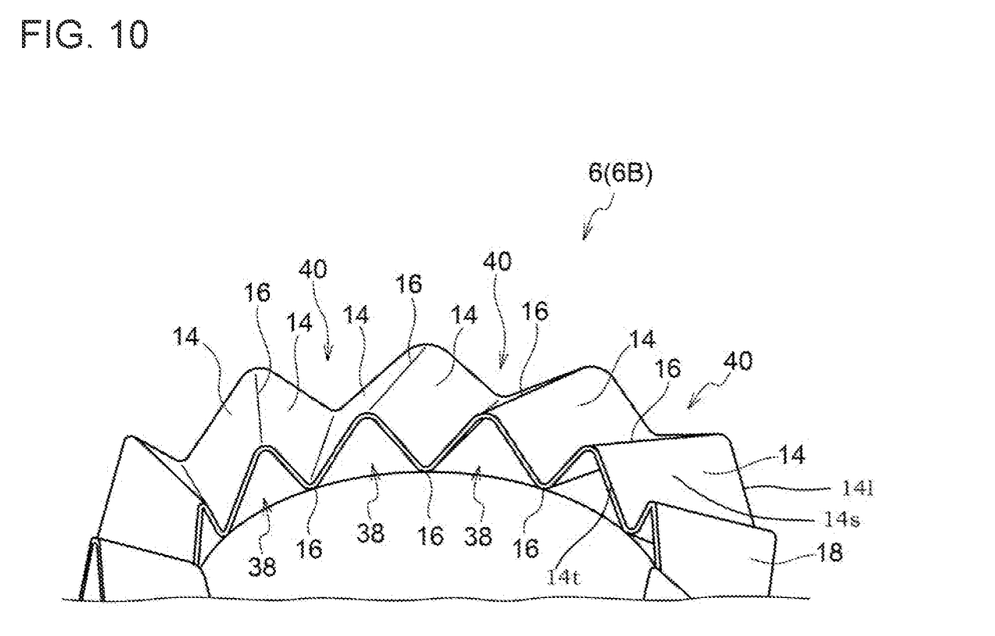
FIG. 10 is a schematic perspective view schematically illustrating a part of a fixed vane unit 6 (6C) according to an embodiment.
Figure 11:
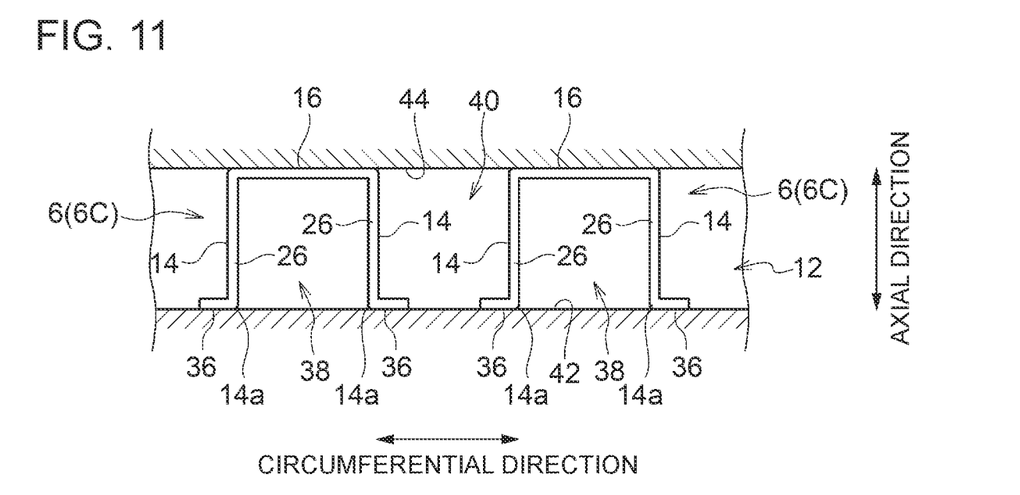
FIG. 11 is a schematic diagram of an example of the shape of a trailing edge 26 of a vane portion 14 of the fixed vane unit 6 (6C).
Figure 12:
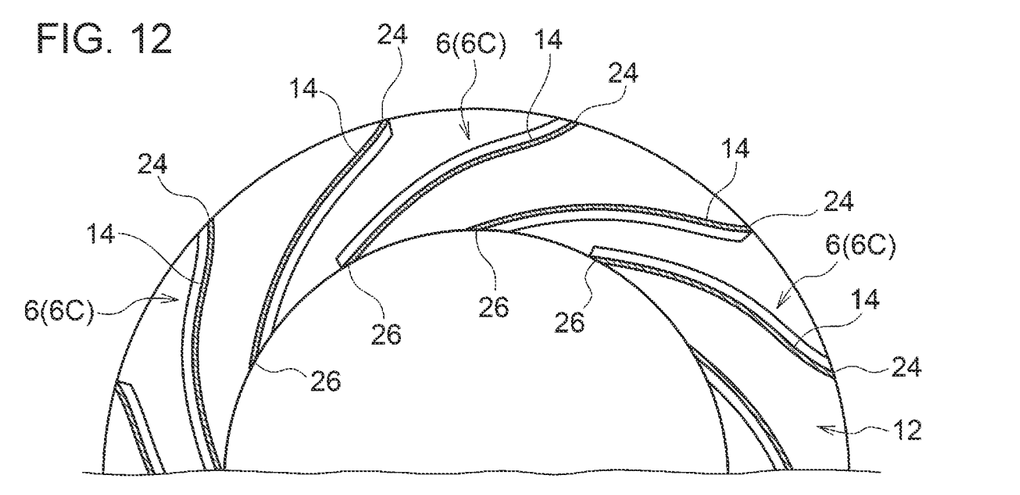
FIG. 12 is a cross-sectional view of the fixed vane unit 6 (6C) taken along line A-A (see FIG. 1), that is, a schematic cross-sectional view schematically illustrating an example of a cross section orthogonal to the axial direction.

FIG. 10 is a schematic perspective view schematically illustrating a part of a fixed vane unit 6 (6C) according to an embodiment. FIG. 11 is a schematic diagram of an example of the shape of a trailing edge 26 of a vane portion 14 of the fixed vane unit 6 (6C). FIG. 12 is a cross-sectional view of the fixed vane unit 6 (6C) taken along line A-A (see FIG. 1), that is, a schematic cross-sectional view schematically illustrating an example of a cross section orthogonal to the axial direction.

In an embodiment, as shown in FIGS. 10 to 12, the fixed vane turbocharger 100 includes a plurality of fixed vane units 6 (6C) disposed at intervals in the circumferential direction. In the depicted embodiment, each of the fixed vane units 6 (6C) has a shape formed by bending the single sheet metal member 18 into a rectangular wave shape (see FIG. 3), and includes two vane portions 14, and one coupling portion 16 coupling the two vane portions 14. As shown in FIG. 10, the van portion 14 includes a leading edge 14l, trailing edge 14t and side edge 14s.

In the embodiment shown in FIGS. 10 to 12, each of the two vane portions 14 has a leg portion 36. The leg portion 36 is disposed so as to protrude from an end portion of the vane portion 14 in the axial direction (in the depicted embodiment, the end portion of the vane portion 14 on the side of the hub-side wall 34 of the communication flow passage 12) toward the opposite side to the coupling portion 16, in the circumferential direction. As shown in FIG. 11, the leg portion 36 is disposed along the flow passage wall (in the depicted embodiment, the hub-side wall 34) of the communication flow passage 12 from the leading edge 24 to the trailing edge 26 of the vane portion 14.

Furthermore, in the embodiment depicted in FIGS. 10 to 12, a plurality of fixed vane units 6 (6C) are configured to divide the communication flow passage 12 so that hub-side flow passages 38 and shroud-side flow passages 40 are positioned alternately in the circumferential direction. Each of the hub-side flow passages 38 is defined by two vane portions 14, a coupling portion 16 coupling the two vane portions 14, and a hub-side wall 42 of the communication flow passage 12. Each of the shroud-side flow passages 40 is defined by two vane portions 14, two leg portions 36, a shroud-side wall 44 of the communication flow passage 12, and a hub-side wall 42 of the communication flow passage 12.

Also with the above configuration, each of the fixed vane units 6 (6C) is formed by a single sheet metal member 18, and thus it is possible to improve the surface roughness and reduce costs of the fixed vane units 6, compared to a case where each fixed vane unit 6 is formed by casting. Thus, it is possible to enhance the rectifying effect of the fixed vane units 6, and improve the efficiency of the turbocharger 100 with a simple configuration. Furthermore, the at least two vane portions 14 are coupled via the coupling portion 16, and thus it is possible to increase the section modulus of the fixed vane unit 6 and suppress deformation and collapse due to the hydrodynamic force.

Furthermore, with the above configuration, the fixed vane unit 6 is divided into a plurality of fixed vane units 6 (6C), and thus the fixed vane units 6 can be reduced in size while ensuring the structure strength, compared to the fixed vane unit 6 (6A, 6B) formed of a single sheet metal member 18 over the entire periphery in the circumferential direction.

Figure 13:
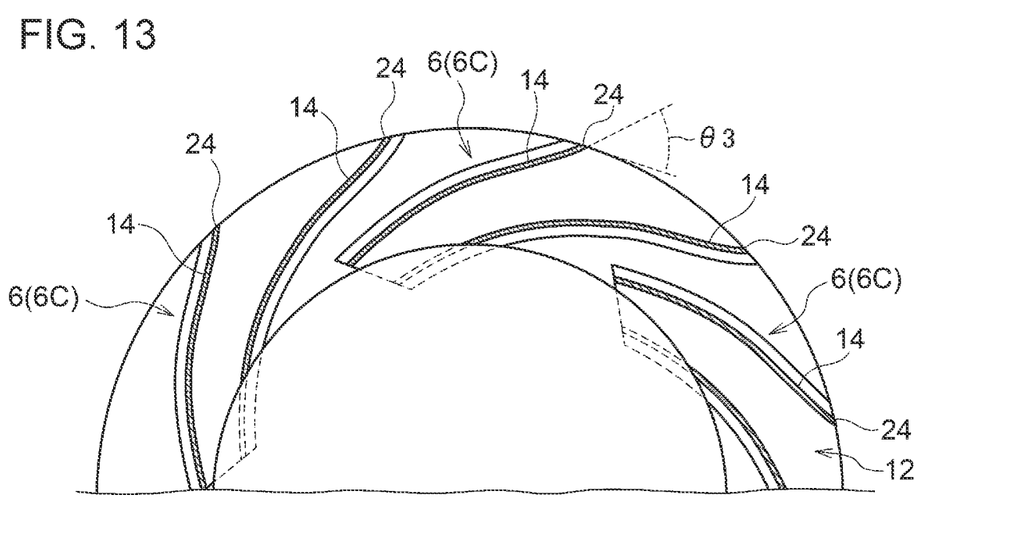
FIG. 13 is a diagram for describing the installment angle of the fixed vane unit 6 (6C) corresponding to a small flow rate.
Figure 14:
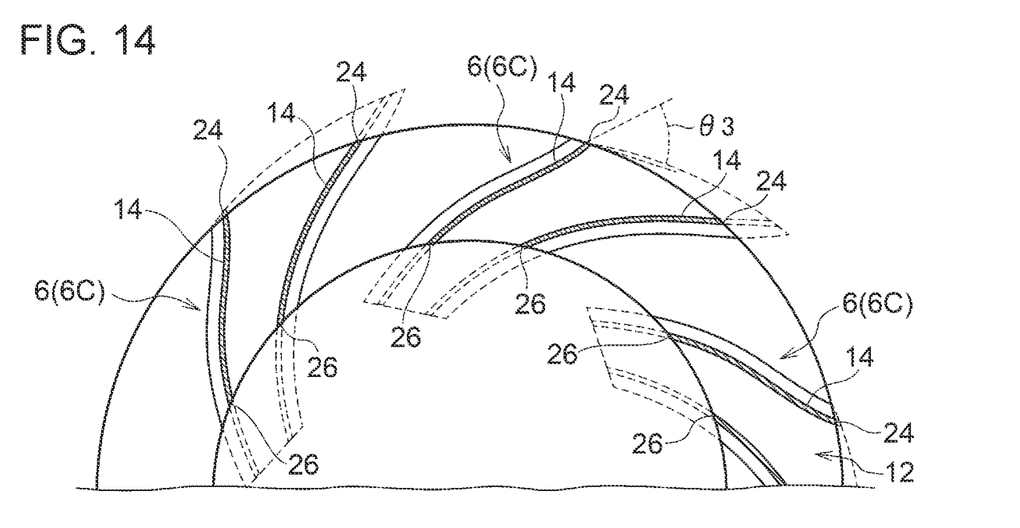
FIG. 14 is a diagram for describing the installment angle of the fixed vane unit 6 (6C) corresponding to a high flow rate.

Further, it is possible to adjust the installment angle of the fixed vane units 6 when installing the fixed vane units 6 (6C), and thus it is possible to achieve flow rate characteristics corresponding to the installment angle of the fixed vane units 6 (6C). For instance, to address a small flow rate, the fixed vane units 6 (6C) may be installed so that the angle θ3 between the chordwise direction of the vane portion 14 and the circumferential direction becomes small, as depicted in FIG. 13. Further, to address a high flow rate, the fixed vane units 6 may be installed so that the angle θ3 between the chordwise direction of the vane portion 14 and the circumferential direction becomes large, as depicted in FIG. 14. Furthermore, the unnecessary part (dotted line in FIGS. 13 and 14) of the fixed vane unit 6 formed of sheet metal produced from a common mold may be cut apart to adjust the installment angle of the fixed vane units 6, which makes it possible to achieve a desired flow rate property with a simple configuration and low costs.

Embodiments of the present invention were described in detail above, but the present invention is not limited thereto, and various amendments and modifications may be implemented.

For instance, while each of the fixed vane units 6 (6C) includes two vane portions 14 and one coupling portion 16 coupling the two vane portions 14 in the embodiment shown in FIGS. 10 to 12, fixed vane units each including three or more vane portions and two or more coupling portions may be disposed at intervals in the circumferential direction. Furthermore, the shape of the vane portion 14 described with reference to FIGS. 7 to 9 can be applied to the vane portion 14 of the fixed vane units 6 (6C) depicted in FIGS. 10 to 12.

Furthermore, in some embodiments, as shown in FIGS. 15 to 19 for instance, the fixed vane turbocharger 100 may include a plurality of (stages of) fixed vane units 6 (6C) stacked in the axial direction.

Figure 15:
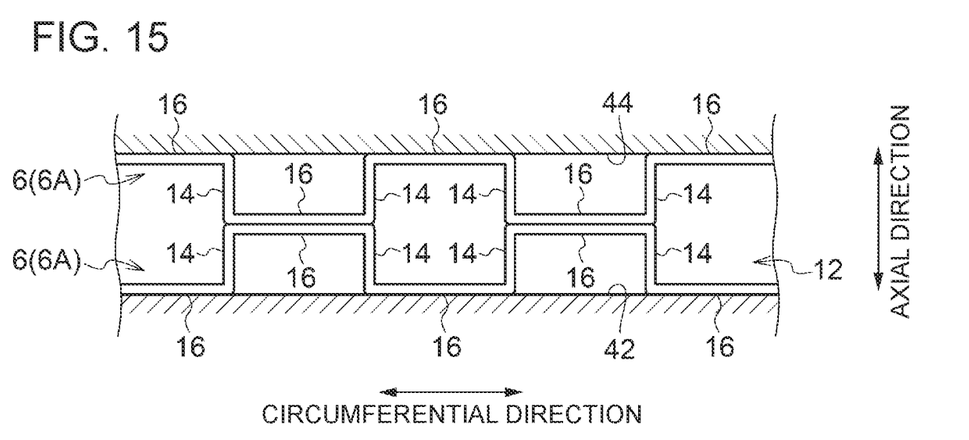
FIG. 15 is a diagram of an example of a combination of two fixed vane units 6.

For instance, as depicted in FIG. 15, the fixed vane turbocharger 100 may include two fixed vane units 6 (6A) stacked in the axial direction. In the depicted embodiment, the two fixed vane units 6 (6A) are stacked in the axial direction such that the respective coupling portions 16 are in contact with each other.

Figure 16:
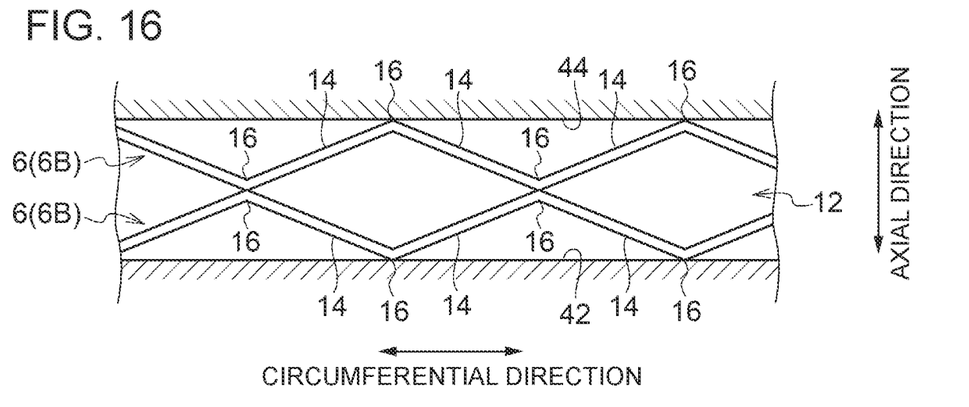
FIG. 16 is a diagram of an example of a combination of two fixed vane units 6.
Figure 17:
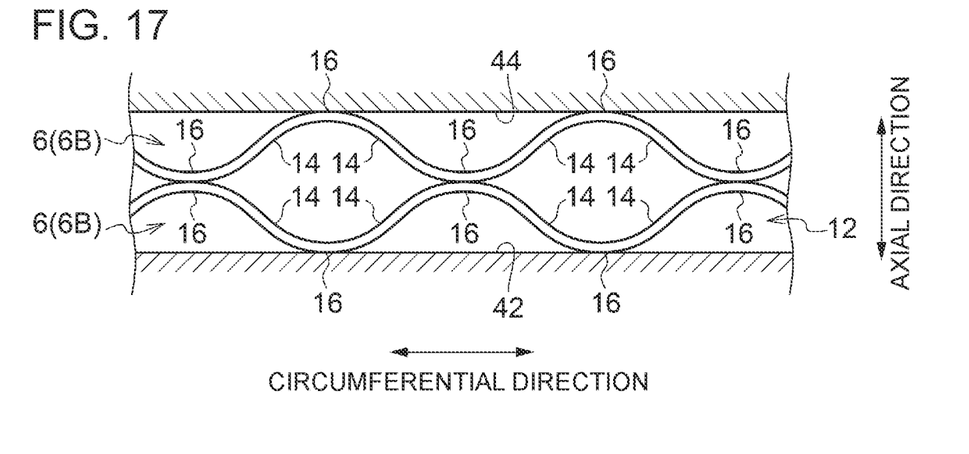
FIG. 17 is a diagram of an example of a combination of two fixed vane units 6.

For instance, as depicted in FIGS. 16 and 17, the fixed vane turbocharger 100 may include two fixed vane units 6 (6B) stacked in the axial direction. In the depicted embodiment, the two fixed vane units 6 (6A) are stacked in the axial direction such that the respective coupling portions 16 are in contact with each other.

Figure 18:
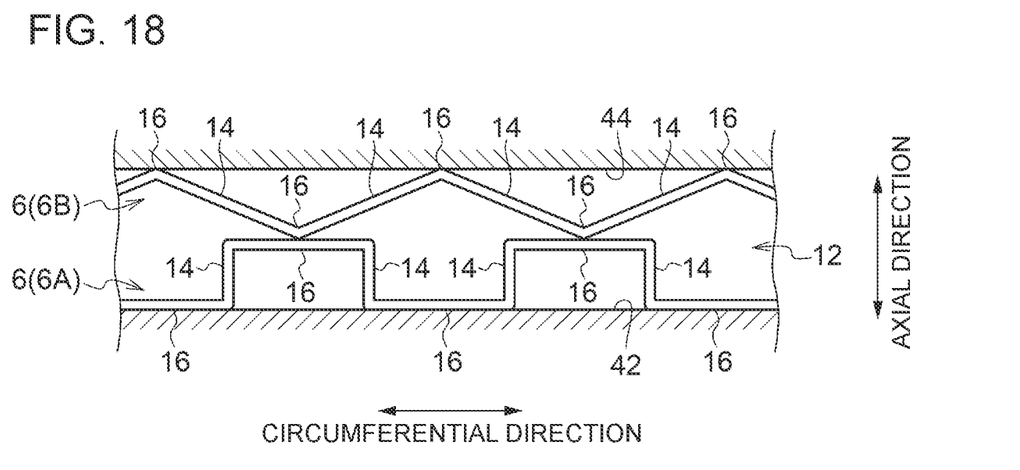
FIG. 18 is a diagram of an example of a combination of two fixed vane units 6.
Figure 19:
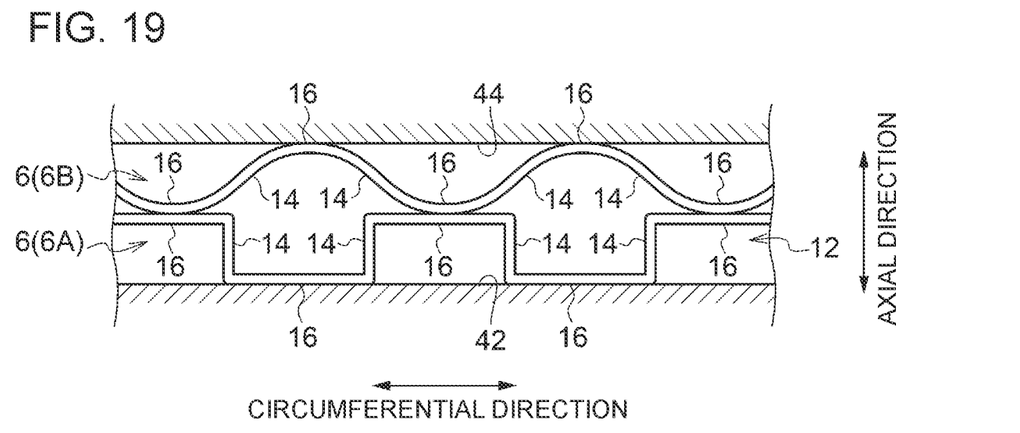
FIG. 19 is a diagram of an example of a combination of two fixed vane units 6.

For instance, as depicted in FIGS. 18 and 19 for instance, the fixed vane turbocharger 100 may include a fixed vane unit 6 (6A) and fixed vane unit 6 (6B) stacked in the axial direction. In the depicted embodiment, the fixed vane unit 6 (6A) and the fixed vane unit 6 (6B) are stacked in the axial direction such that the respective coupling portions 16 are in contact with each other.

Furthermore, for instance, the present invention is also applicable to a diffuser blade of a compressor of a turbocharger.

In this case, the fixed vane turbocharger includes a compressor impeller, a housing including, inside thereof, an impeller housing space which accommodates the compressor impeller, a scroll flow passage formed on the radially outer side of the compressor impeller, and a communication flow passage (diffuser flow passage) which brings the impeller housing space and the scroll flow passage into communication, an at least one fixed vane unit (diffuser vane unit) disposed in the communication flow passage and fixed to a portion on the inner side of the scroll flow passage in the radial direction of the compressor impeller in the housing. Furthermore, each of the fixed vane units includes at least two vane portions and a coupling portion coupling the two vane portions, and is formed by a single sheet metal member.

Also with the above configuration, each of the fixed vane units is formed by a single sheet metal member, and thus it is possible to improve the surface roughness and reduce costs of the fixed vane units 6, compared to a case where each fixed vane unit 6 is formed by casting. Thus, it is possible to enhance the rectifying effect of the fixed vane units, and improve the efficiency of the turbocharger with a simple configuration.

Furthermore, the at least two vane portions are coupled via the coupling portion, and thus it is possible to increase the section modulus of the fixed vane unit and suppress deformation and collapse due to the hydrodynamic force.

DESCRIPTION OF REFERENCE NUMERALS

2 Turbine impeller
2a Rotor blade
4 Housing
4a Portion
6 Fixed vane unit
8 Impeller housing space
10 Scroll flow passage
12 Communication flow passage
14 Vane portion
14a First end portion
14b Second end portion
16 Coupling portion
18 Sheet metal member
20 Trailing-edge side portion
22 Pressure surface
24 Leading edge
26 Edge
28 Leading-edge side portion
30 Tip
32 Shroud wall
34 Hub wall
36 Edge portion
38 Hub-side flow passage
40 Shroud-side flow passage
42 Hub-side wall
44 Shroud-side wall
100 Fixed vane turbocharger
L1, L2 Tangent

The invention claimed is:

1. A fixed vane turbocharger, comprising:
an impeller;
a housing including, inside thereof, an impeller housing space which accommodates the impeller, a scroll flow passage formed on a radially outer side of the impeller, and a communication flow passage which brings the impeller housing space and the scroll flow passage into communication; and
at least one fixed vane unit disposed in the communication flow passage and fixed to a portion of the housing on an inner side of the scroll flow passage with respect to a radial direction of the impeller,
wherein each of the at least one fixed vane unit includes at least two vane portions and a coupling portion coupling the two vane portions, each of the vane portions comprising a vane having a pressure surface and a suction surface, the coupling portion coupling each of side edges of the two vane portions from each of leading edges to trailing edges of the two vane portions, and
wherein each of the at least one fixed vane unit has a shape formed by bending or curving a single sheet metal member,
wherein the at least one fixed vane unit includes a plurality of separate fixed vane units disposed at intervals in a circumferential direction.

2. The fixed vane turbocharger according to claim 1, wherein at least a trailing-edge side portion of the vane portion is curved so as to be convex on a side of a pressure surface.

3. The fixed vane turbocharger according to claim 1, wherein a leading-edge side metal angle which is an angle formed by a tangent in a circumferential direction of the impeller at a leading edge of the vane portion is greater than a trailing-edge side metal angle which is an angle formed by a tangent in the circumferential direction of the impeller at a trailing edge of the vane portion.

4. The fixed vane turbocharger according to claim 1, wherein a trailing edge of the vane portion extends in a direction inclined toward a circumferential direction from an axial direction of the impeller.

5. The fixed vane turbocharger according to claim 1, wherein the single sheet metal member has a shape including a rectangular wave shape, a triangular wave shape, or a sine wave shape.

6. The fixed vane turbocharger according to claim 1, wherein the fixed vane unit is configured to divide the communication flow passage such that a hub-side flow passage and a shroud-side flow passage are positioned alternately in the communication flow passage in a circumferential direction,
wherein each hub-side flow passage is defined by two of the vane portions, the coupling portion coupling the two vane portions and a hub-side wall of the communication flow passage, and
wherein each shroud-side flow passage is defined by two of the vane portions, the coupling portion coupling the two vane portions, and a shroud-side wall of the communication flow passage.

7. A fixed vane turbocharger, comprising:

an impeller;

a housing including, inside thereof, an impeller housing space which accommodates the impeller, a scroll flow passage formed on a radially outer side of the impeller, and a communication flow passage which brings the impeller housing space and the scroll flow passage into communication; and at least one fixed vane unit disposed in the communication flow passage and fixed to a portion of the housing on an inner side of the scroll flow passage with respect to a radial direction of the impeller, wherein each of the at least one fixed vane unit includes at least two vane portions and a coupling portion coupling the two vane portions, each of the vane portions comprising a vane having a pressure surface and a suction surface, the coupling portion coupling each of side edges of the two vane portions from each of leading edges to trailing edges of the two vane portions, and wherein each of the at least one fixed vane unit has a shape formed by bending or curving a single sheet metal member, wherein the at least one fixed vane unit includes a plurality of fixed vane units stacked in an axial direction of the impeller, each of the plurality of fixed vane units having a different shape.

8. The fixed vane turbocharger according to claim 7, wherein the at least one fixed vane unit is formed by the single sheet metal member over an entire periphery in a circumferential direction of the impeller.

9. The fixed vane turbocharger according to claim 7, wherein at least a trailing-edge side portion of the vane portion is curved so as to be convex on a side of a pressure surface.

10. The fixed vane turbocharger according to claim 7, wherein a leading-edge side metal angle which is an angle formed by a tangent in a circumferential direction of the impeller at a leading edge of the vane portion is greater than a trailing-edge side metal angle which is an angle formed by a tangent in the circumferential direction of the impeller at a trailing edge of the vane portion.

11. The fixed vane turbocharger according to claim 7, wherein a trailing edge of the vane portion extends in a direction inclined toward a circumferential direction from an axial direction of the impeller.

12. A fixed vane turbocharger, comprising:

an impeller;

a housing including, inside thereof, an impeller housing space which accommodates the impeller, a scroll flow passage formed on a radially outer side of the impeller, and a communication flow passage which brings the impeller housing space and the scroll flow passage into communication; and at least one fixed vane unit disposed in the communication flow passage and fixed to a portion of the housing on an inner side of the scroll flow passage with respect to a radial direction of the impeller, wherein each of the at least one fixed vane unit includes at least two vane portions and a coupling portion coupling the two vane portions, each of the vane portions comprising a vane having a pressure surface and a suction surface, the coupling portion coupling each of side edges of the two vane portions from each of leading edges to trailing edges of the two vane portions, and wherein each of the at least one fixed vane unit has a shape formed by bending or curving a single sheet metal member, wherein a leading-edge side portion of the vane portion is rounded so that a tip of the leading-edge side portion is positioned downstream of a leading edge of the vane portion, the leading-edge side portion including a predetermined range from the tip of the vane portion.

13. The fixed vane turbocharger according to claim 12, wherein the at least one fixed vane unit is formed by the single sheet metal member over an entire periphery in a circumferential direction of the impeller.

14. The fixed vane turbocharger according to claim 12, wherein at least a trailing-edge side portion of the vane portion is curved so as to be convex on a side of a pressure surface.

15. The fixed vane turbocharger according to claim 12, wherein a leading-edge side metal angle which is an angle formed by a tangent in a circumferential direction of the impeller at a leading edge of the vane portion is greater than a trailing-edge side metal angle which is an angle formed by a tangent in the circumferential direction of the impeller at a trailing edge of the vane portion.

16. The fixed vane turbocharger according to claim 12, wherein a trailing edge of the vane portion extends in a direction inclined toward a circumferential direction from an axial direction of the impeller.

* * * * *